Figure 3:
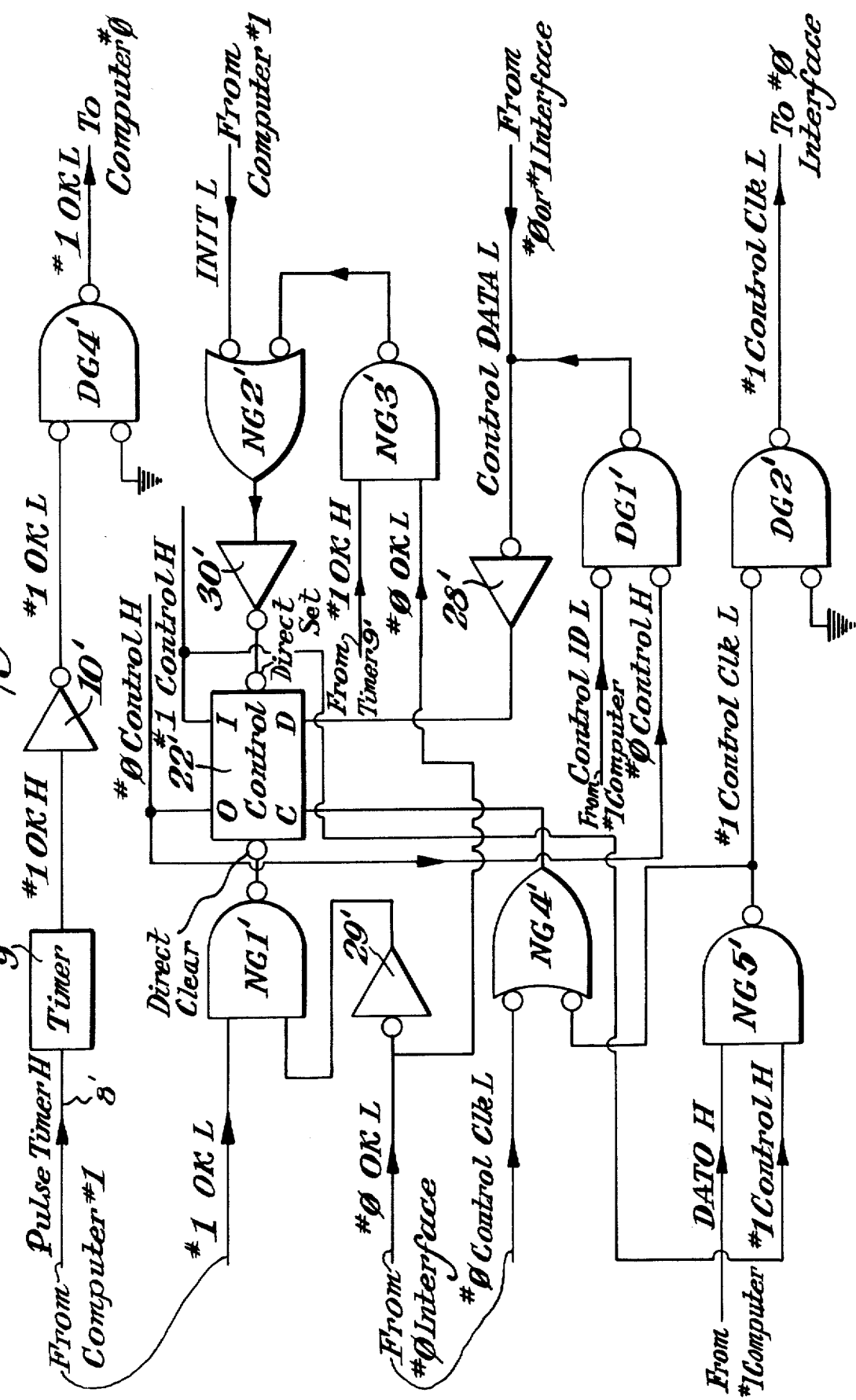

United States Patent [19]
Jordan, Jr. et al.

[11] 3,991,407
[45] Nov. 9, 1976

[54] COMPUTER REDUNDANCY INTERFACE

[75] Inventors: Lloyd E. Jordan, Jr.; Doane W. Lee, both of Victoria, Tex.

[73] Assignee: E. I. Du Pont de Nemours and Company, Wilmington, Del.

[22] Filed: Apr. 9, 1975

[21] Appl. No.: 566,425

[52] U.S. Cl. .............................................. 340/172.5
[51] Int. Cl.² .......................................... G06F 15/16
[58] Field of Search ................................. 340/172.5

[56] References Cited
UNITED STATES PATENTS

| | | |
|---|---|---|
| 3,303,474 | 2/1967 | Moore et al. ............... 340/172.5 |
| 3,786,433 | 1/1974 | Notley et al. ............... 340/172.5 |
| 3,882,455 | 5/1975 | Heck et al. ............... 340/172.5 X |

Primary Examiner—Raulfe B. Zache

[57] ABSTRACT

Apparatus for maintaining liaison between two parallel-connected computers in which one computer is in control of a process and the other computer is in standby, wherein the operation of the controlling computer is monitored and control switched to the standby computer when the operation of the controlling computer becomes erratic or when an operator elects to effect the switch.

6 Claims, 12 Drawing Figures

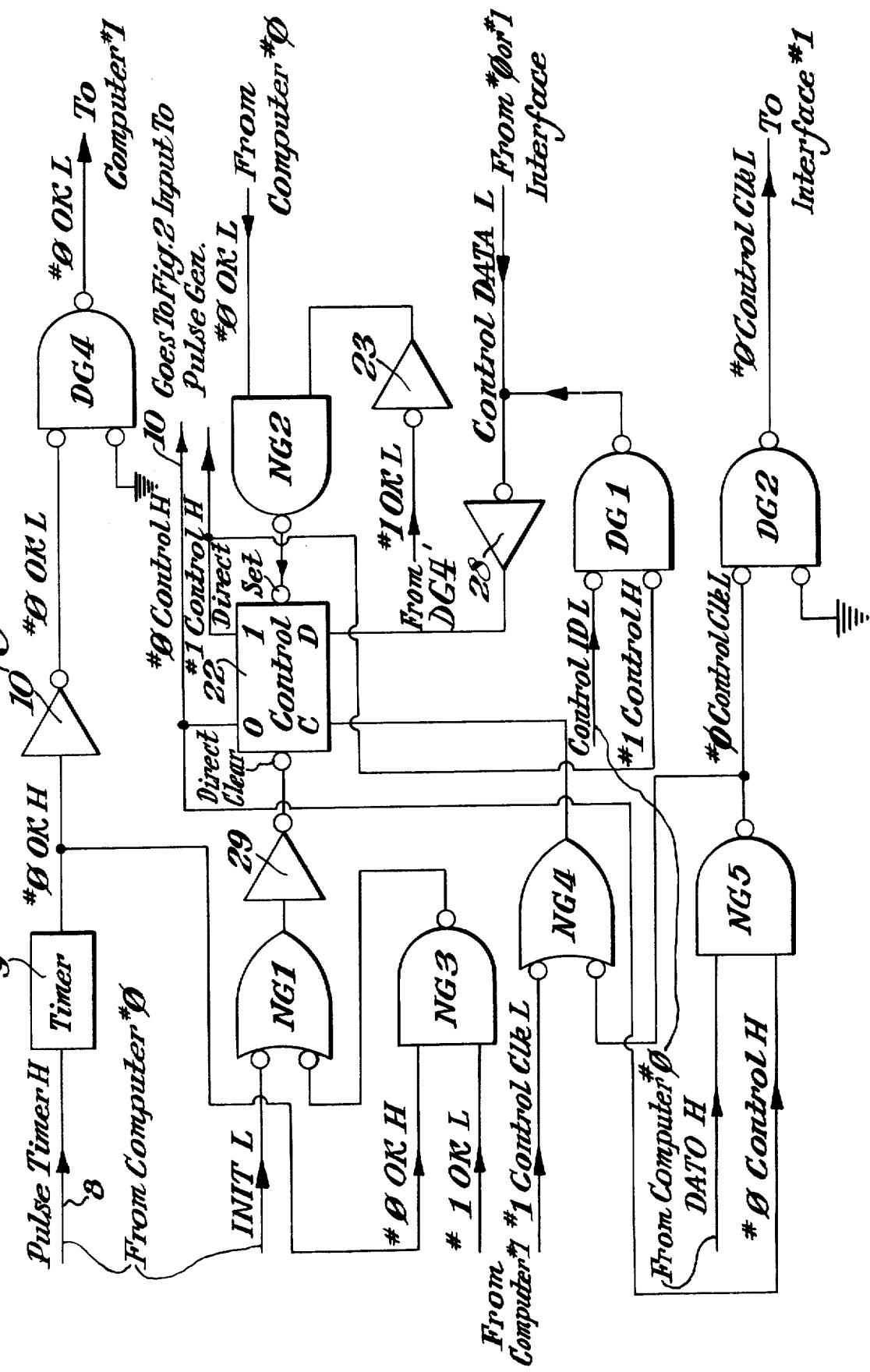

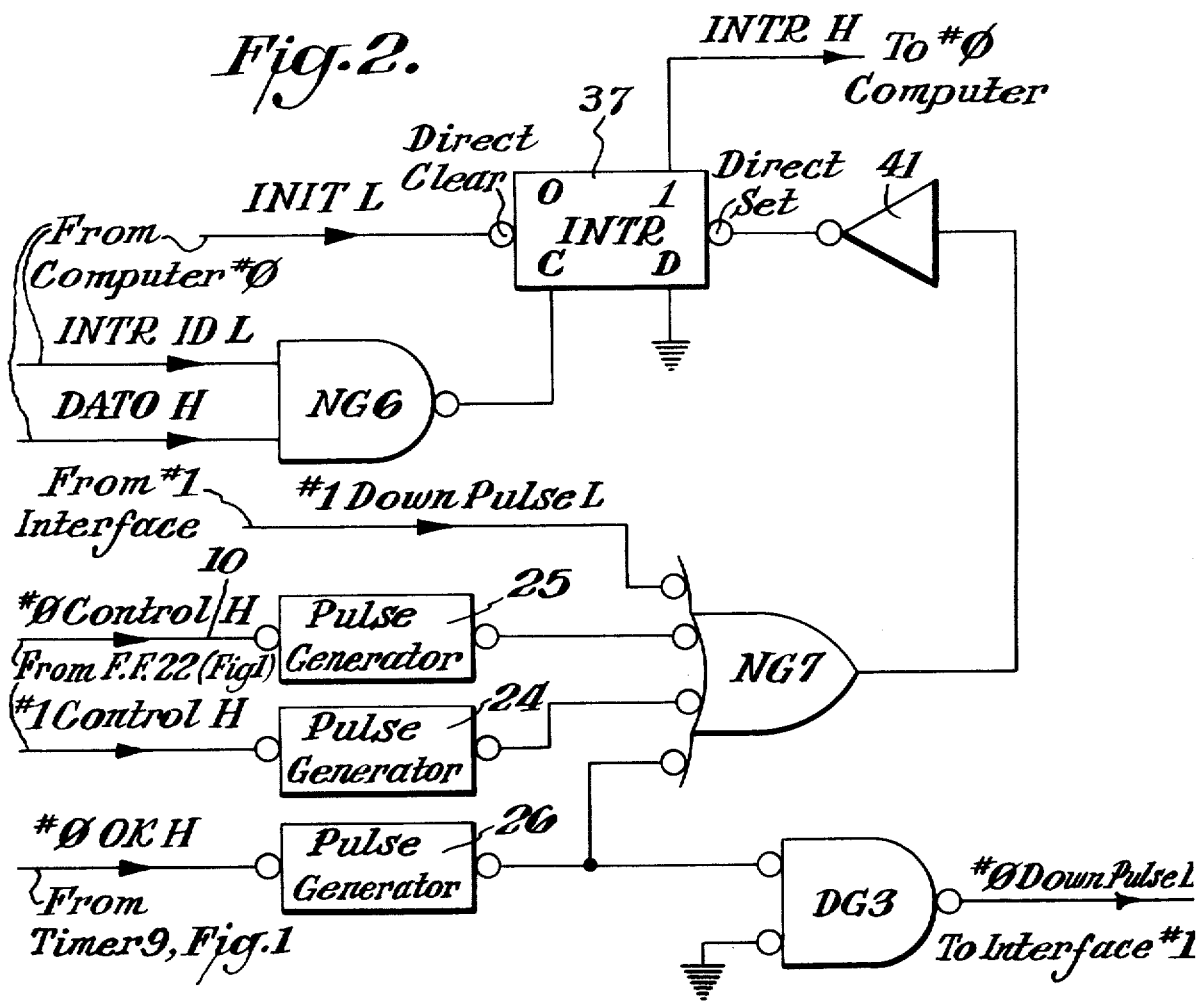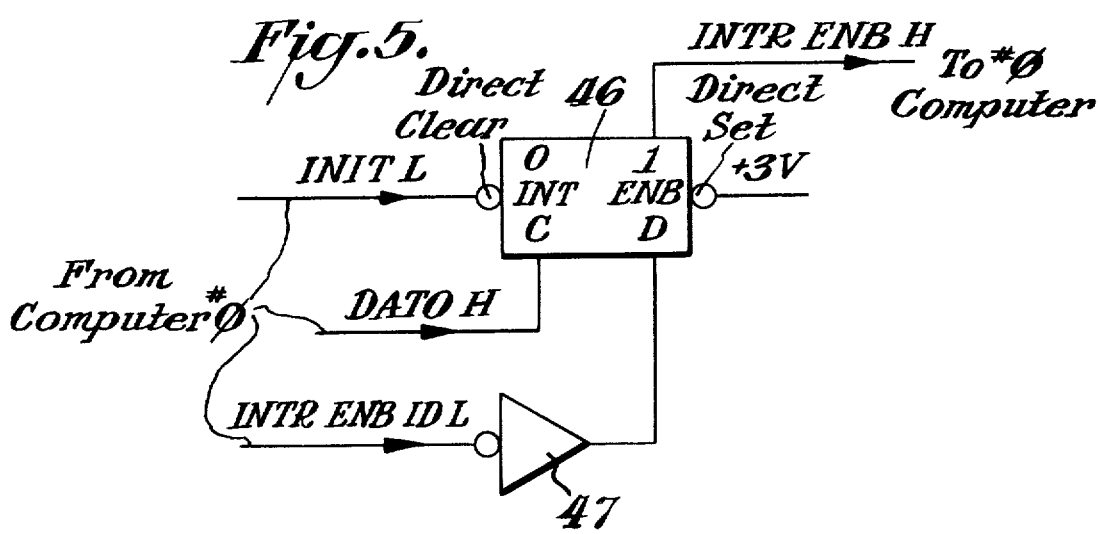

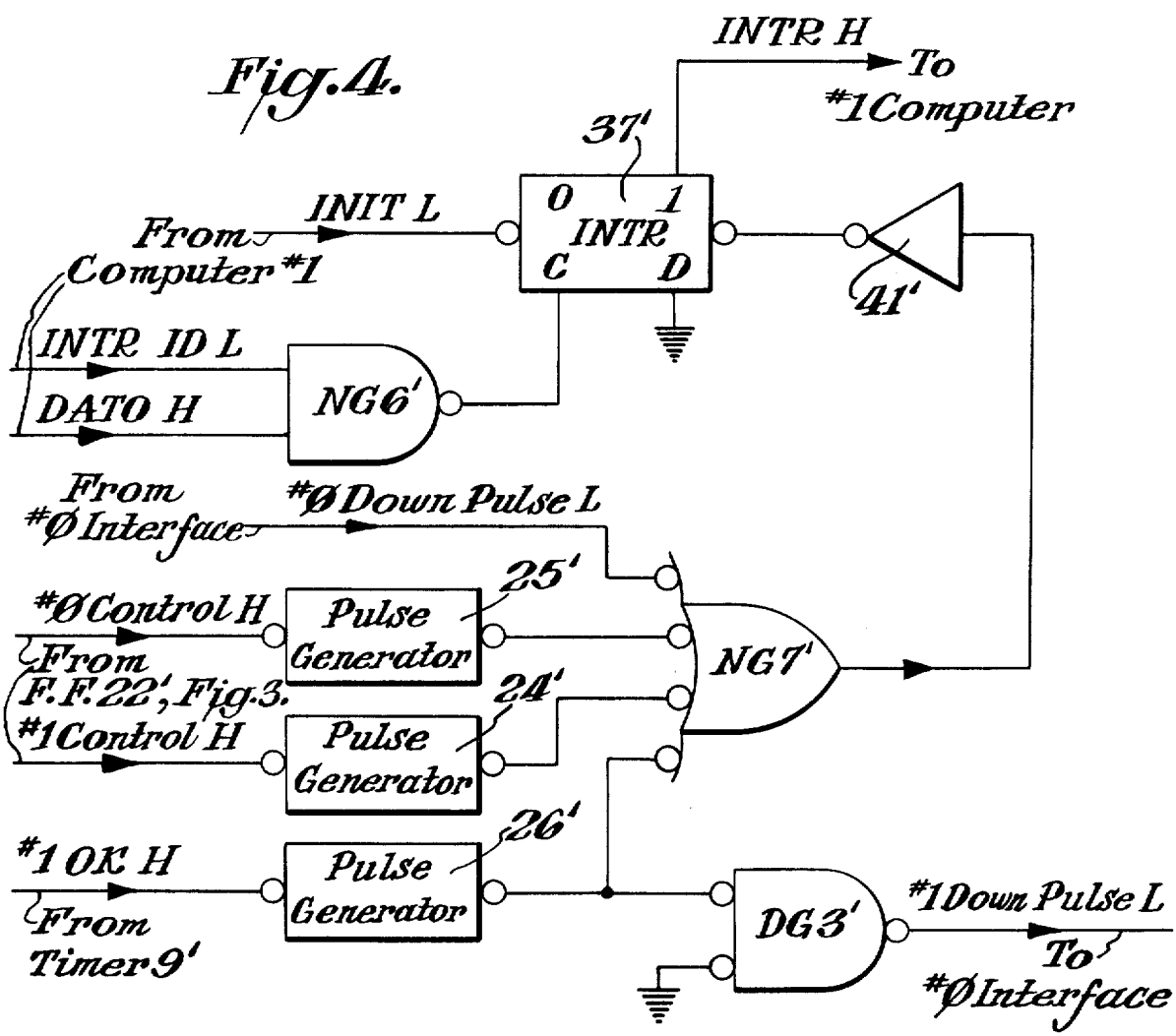
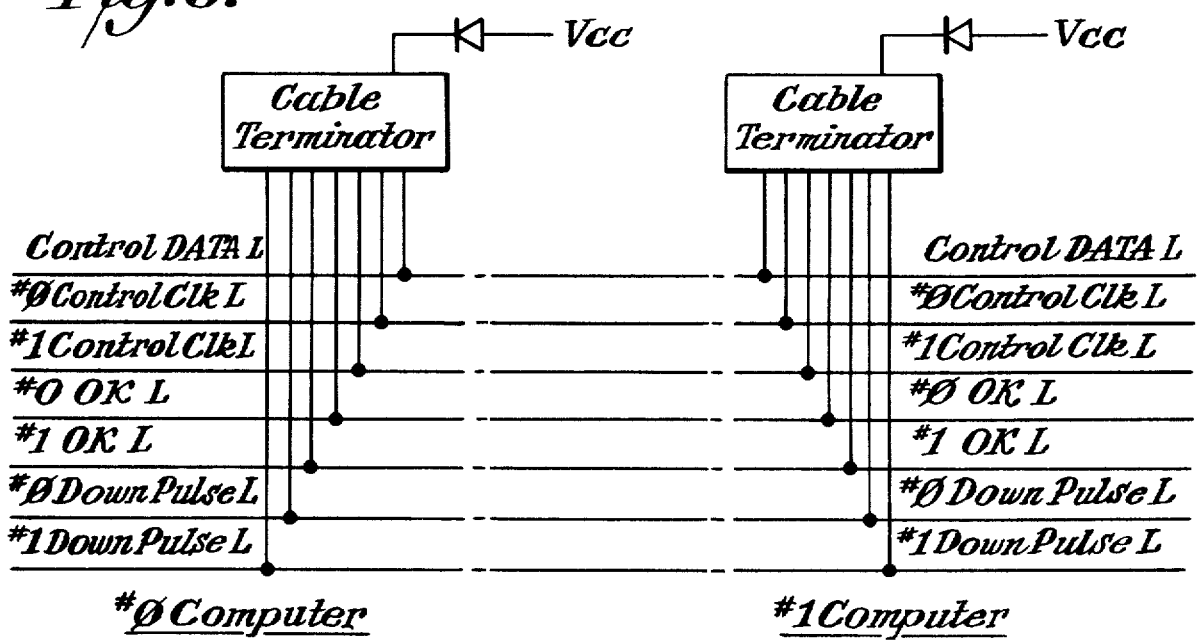

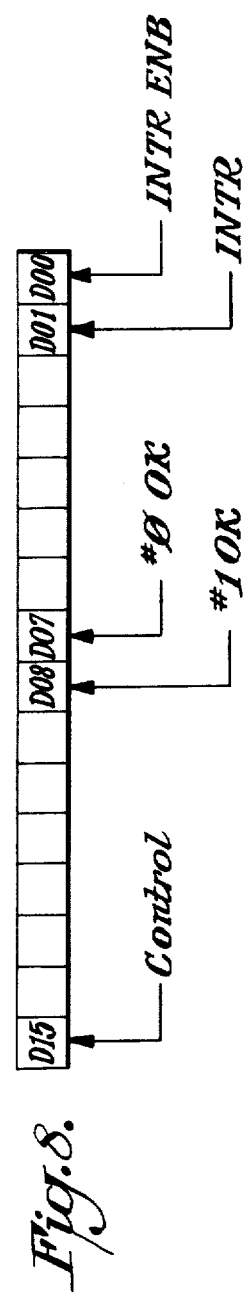

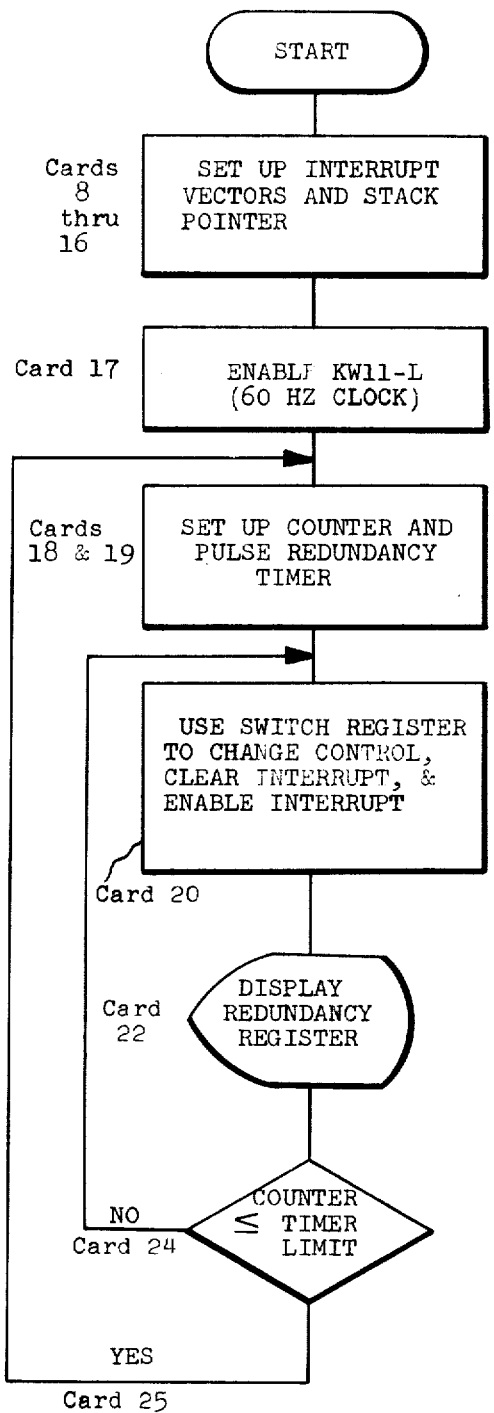
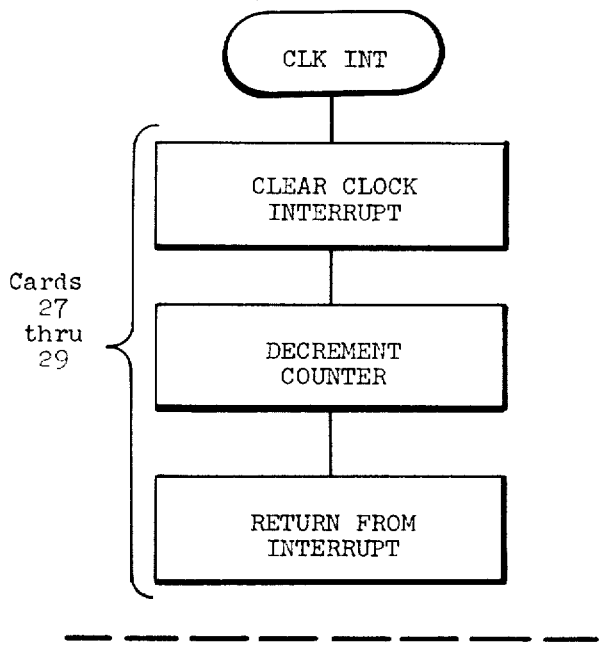
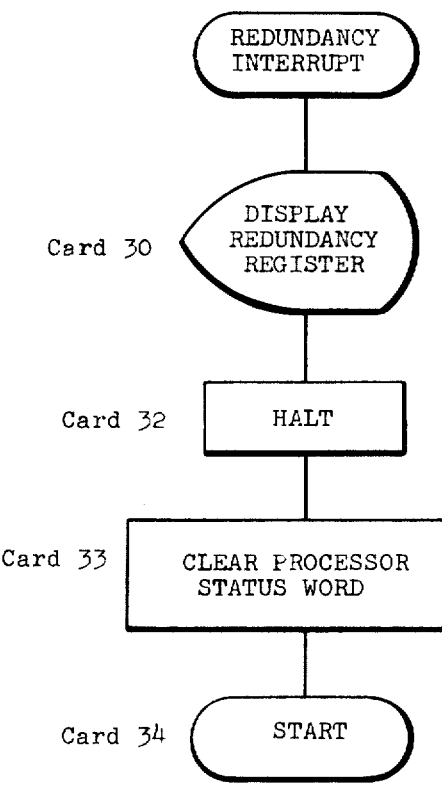

COMPUTER REDUNDANCY INTERFACE

BRIEF SUMMARY OF THE INVENTION

Generally, this invention comprises a redundancy interface maintaining liaison between two parallel-connected computers, the first of which is nominated for on-line process control whereas the second is in standby until called upon to take over control from the first if, for any reason, the first computer is disabled or arbitrarily taken out of service, comprising, in combination, a first sub-circuit associated with the first computer and a second sub-circuit associated with the second computer, these sub-circuits each comprising:

a. timer means monitoring the operation of its associated computer and verifying acceptable computer operability by output of an electrical timer signal, b. computer status designating means, c. switching means responsive to computer software actuating the computer status designating means.

d. fault designating means cleared by computer software, e. fault detecting means responsive to said electrical timer signals individually or to said computer status designating means actuating said fault designating means, f. interrupt means halting the task currently in execution by the associated computer responsive to the fault designating means, g. communication means maintaining electrical circuit connection between the two sub-circuits, and h. display means indicating operation, for both of the computers, of the timer means and the states of the computer status designating means, the fault designating means and the interrupt means.

The preferred embodiment hereinafter detailed utilizes the following specific hardware corresponding to the general components herebefore set forth:

a′. timer means = timer, b′. computer status designating means = control flip-flops, c′. switching means = control logic, d′. fault designating means = interrupt flip-flop, e′. fault detecting means = interrupt logic, f′. interrupt means = interrupt enable logic and flip-flop, g′. communication means = input/output cable and cable terminator, and h′. display means = redundancy register.

DRAWINGS

The following schematic drawings depict a preferred embodiment of apparatus according to the invention, in which:

FIG. 1 is a logic control circuit diagram for the interface associated with the first computer, denoted the No. 0 computer to conform with the initial state of the operative control flip-flop effecting in-control connection of this first computer and with the logic which effects software switching.

Figure 7:
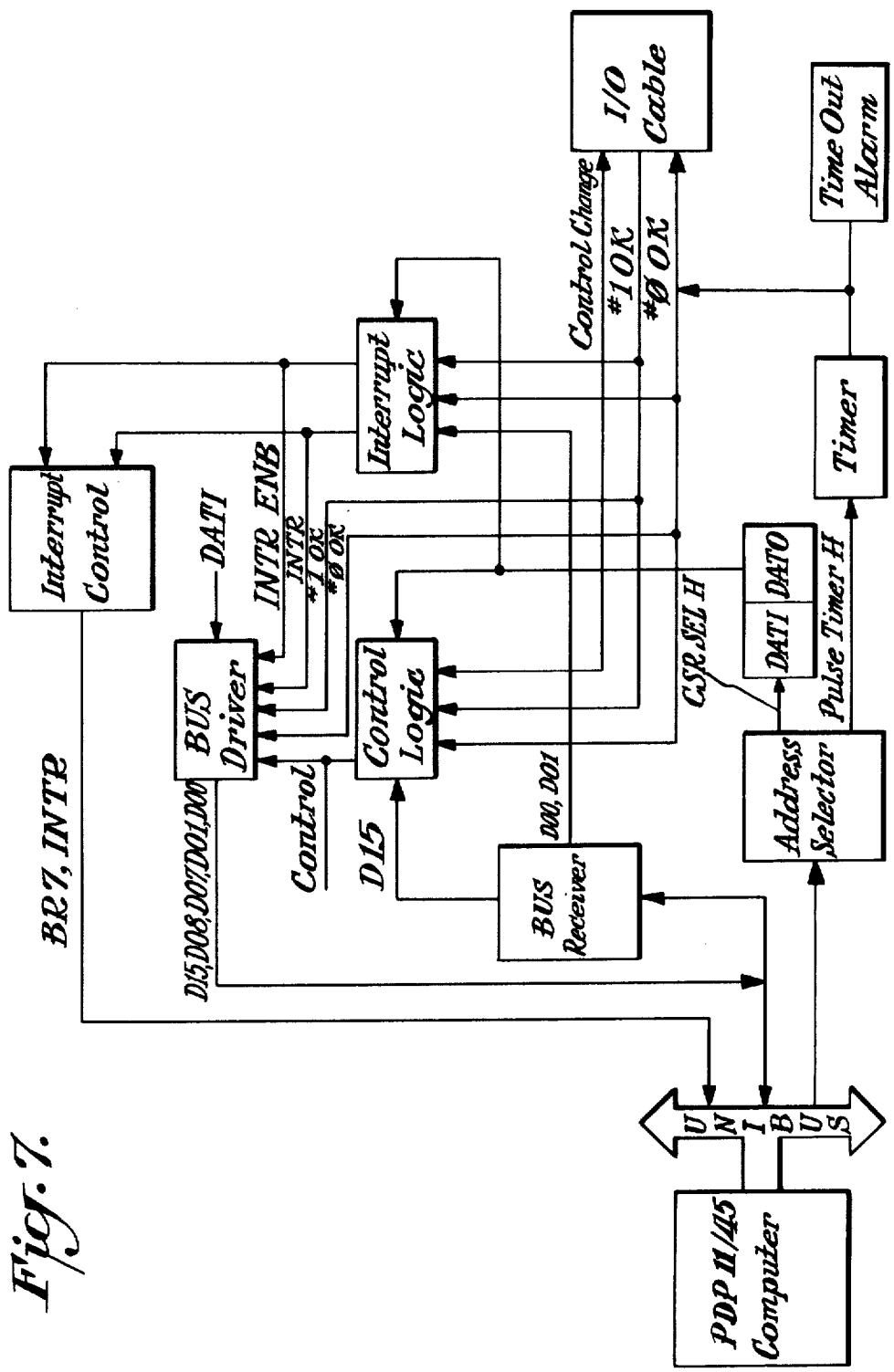

FIG. 2 is a logic interrupt circuit diagram for the interface associated with the first computer (i.e., No. 0 computer) of FIG. 1, FIG. 3 is a logic control circuit diagram for the interface associated with the second computer, denoted the No. 1 computer to conform with the initial state of the operative control flip-flop effecting in-control connection of this second computer and with the logic which effects software switching, FIG. 4 is a logic interrupt circuit diagram for the interface associated with the second (i.e., No. 1) computer of FIG. 3, FIG. 5 is a logic control circuit for the interface associated with a given one of the computers, in this case the No. 0 computer of FIGS. 1 and 2, FIG. 6 is a circuit diagram showing the input/output cable common to the interfaces of Computer No. 0 and Computer No. 1, FIG. 7 is a block diagram showing the several components of the No. 0 interface in connection with its associated No. 0 computer, FIG. 8 is a specific design of storage register adapted to use with the interface of this invention, FIG. 9 is a module layout indicating the several connections of the circuit components according to this invention to the PDP 11/45 computer utilized in the detailed embodiment of this invention, FIG. 10 is the main line program flow chart, FIG. 11A is the CLOCK INTERRUPT service routine flow chart, and FIG. 11B is the REDUNDANCY INTERRUPT service routine flow chart.

DESCRIPTION

This invention relates particularly to computerized control of industrial processes, wherein, for purposes of safety and continuity of manufacturing, it is the most prudent course to back up the computer in direct control of process conduct with a second, parallel-connected computer in standby, so that control can be speedily shifted from the computer in direct control to the computer in standby either automatically, in the event of disability of the computer in direct control, or arbitrarily, at the behest of a human operator, as the case may be.

In either instance, it is necessary to provide simultaneous and continuous monitoring of the operational status of both computers, together with automatic switch-over, by either computer independently of the other, of computer control functions whenever the computer in control is to be displaced. The redundancy interface of this invention fulfills these requirements.

The apparatus of this invention monitors the operational status of each computer and automatically designates the computer in control. The choice of control computer is made by computer software, whereas it is preferred to employ hardware to operate a switch which simultaneously brings the computer of choice on line while disabling the control output from the other of the computer pair.

In the typical installation now described, Digital Equipment Corporation PDP 11/45 computers were employed. It will be understood that the computer in process control performs all specific control tasks in addition to updating data, whereas the standby computer performs no tasks and does no work except the updating of data, in order that it will have immediate capability to take over whenever its teammate is made to relinquish control.

It is convenient to start this description with the interface storage register which contains five bits. FIG. 8 details the relationship of these five bits with the 16-bit words used in the PDP 11/45 computer.

For purposes of brevity, the nomenclature employed herein is phrased in terms of the following register bit identities (refer FIG. 8):

| BIT | FUNCTION |
| --- | --- |
| CONTROL (Bit D15) | This bit designates the computer in control. Since there are only two computers, the state of this bit being a logic 0 or logic 1 designates No. 0 or No. 1 computer in control, respectively. bit is automatically changed by the hardware and can be modified only by the software in the designated computer. |
| No. 0 OK (Bit D07) | This bit, which indicates the operational status of the No. 0 computer, represents the output of a timer associated with the No. 0 computer. This timer must be periodically reset by the software in computer No. 0 to maintain the timer output at a logic 1 (HIGH) to indicate that the computer is operating satisfactorily. |
| No. 1 OK (Bit D08) | This bit corresponds to the immediately preceding bit, except that it is specific to the No. 1 computer. All functions and operations are the same as that of the No. 0 OK bit. |
| INTR (Bit D01) | This bit, being a logic 1, designates that an interrupt is in progress. The logic 1 (HIGH) condition is indicated when there is a change in the CONTROL bit or a change in the No. 0 OK or No. 1 OK bits going from a logic 1 to a logic 0. This bit can only be changed by software to a logic 0 (LOW). |
| INT ENB (Bit D00) | This bit, being a logic 1, enables computer hardware interaction with the program if the INTR bit is a logic 1. This bit can be set or cleared under software control. |

Two interfaces are needed, one disposed in each computer. An input/output (I/O) cable is used to join the interfaces, as shown in FIG. 6, to inform one computer of changes in the redundancy register that occurred in the other computer.

All signals hereinafter described are processed at two preselected different voltage levels, denoted, in the figures, "H" for HIGH (i.e., between 2.4 and 4 volts, approximately) and "L" for LOW (i.e., between 0.0 and 0.8 volt approximately). The LOW state is the asserted condition on the buses of the redundancy input/output cable, FIG. 6.

Referring now to FIGS. 1 and 3, each of the interface sub-circuits of this invention is provided with its own individual pulse timer 9 and 9', respectively, each switched on by a signal, "Pulse Timer H," received from its associated computer via lines 8 and 8', respectively.

Timers 9 or 9' are used to indicate whether a process task, or a set of specific tasks, are completed correctly on a routine basis. To effect this, a convenient time interval is selected for setting the time spans of the timers, such time interval being long enough to exceed the normal duration of a given process task, or several such tasks, typically anywhere from 0.5 to 30 seconds, depending upon the process involved. Just prior the expiration of each timer cycle, the timer is reset by its associated computer, subject to the process control remaining within the operative limits. However, if the associated computer does not progressively achieve its programmed goals, it does not reset its timer and control switchover to the standby computer is thereupon effected. The timer 9 (or 9') of the standby computer is tolled simultaneously (but not necessarily synchronously) with the timer for the other computer of the pair, but its role is strictly that of monitoring the standby computer per se, i.e., free of any current process control effectuation.

The timer circuits of FIGS. 1 and 3 are identical, each timer emitting a signal No. 0 (or No. 1) OK H, which is passed to an inverting amplifier 10 (or 10') with output No. 0 (or No. 1) OK L and thence to a driver gate DG 4 (or 4') with output No. 0 (or No. 1) OK L, which latter, in the case of the No. 0 circuitry, passes via the I/O cable of the interface (FIG. 6) to the other computer of the pair, i.e., No. 1 computer from No. 0 interface, and, conversely, to No. 0 computer from No. 1 circuitry and interface.

Turning now to the control logic of computers No. 0 (FIG. 1) and No. 1 (FIG. 3) it will be seen that the several hardware components of these sub-circuits are identical; however, their inter-connections are somewhat different, and so are the inputs of the several signals.

The control logic performs the following functions:
1. Automatically changes the CONTROL bit (D15), FIG. 8, in the event of a control system failure.
2. Prevents software modification of the CONTROL bit to designate an inoperative computer as the control choice.
3. Prevents any computer other than the designated computer from modifying the CONTROL bit.
4. Updates one redundancy interface to changes made in the other.

Selecting the No. 0 control logic of FIG. 1 for detailed exposition, the central component of the circuit is the conventional flip-flop 22, which has the usual direct set and direct clear input terminals in addition to the usual data (D) and clock (C) terminals shown.

The CONTROL logic hardware (Military Specification convention) consists of an assemblage of NAND gates, denoted NG 1 – NG 5, inclusive, three driver gates, DG 1, DG2 and DG 4, and three inverting amplifiers. As shown in FIG. 1, direct set of flip-flop 22 is achieved by NANDing (through NG 2) the NO. 0 OK L signal (from DG 4) with the No. 1 OK L signal from No. 1 interface after passage through inverting amplifier 23, which gives a LOW (or set) signal applied to the direct set terminal. Flip-flop 22 passes a No. 1 CONTROL H signal to pulse generator 24 of FIG. 2 and simultaneously directs process control switchover via the computer software of computer No. 1.

Similarly, direct clear of flip-flop 22 is achieved by NANDing the computer No. 0 OK H signal with the computer No. 1 OK L signal (which must be in disqualified state) in NG 3, the L output of which is in turn NANDed (in NG 1) with the INIT (initial) L signal from computer No. 0 to give an H output applied to inverting amplifier 29, which inverts the signal to L and applies it to the direct clear input of flip-flop 22. In direct clear state the output from flip-flop 22 will be No. 0 CONTROL H signal to pulse generator 25 of FIG. 2 and this signal simultaneously directs process control switchover via the computer software of computer No. 0.

Clock (C) and Data (D) inputs of flip-flop 22 require simultaneous imposition of signals to both of these terminals and these, individually, require NANDing of computer No. 0 software pulse signals with the two computer CONTROL designation signals which have to be coordinated therewith to prevent ambiguous or erroneous designation of the computer which can be reliably switched into process control.

Thus, the DATA OUT HIGH, i.e., DATO H, signal from computer No. 0 is NANDed with No. 0 CONTROL H via NG 5 to give No. 0 CONTROL CLK(CLOCK) L. The latter is NANDed with No. 1 CONTROL CLK L via NG 4, giving the HIGH CLOCK signal applied to the No. 0 computer CONTROL flip-flop 22 (CLOCK) terminal.

Simultaneously, the No. 0 CONTROL CLK L signal passes through driver gate DG 2 and thence, as No. 0 CONTROL CLK L, via the interface of FIG. 6 to computer No. 1.

Similarly, the DATA terminal input of flip-flop 22 is provided by NANDing the input of a CONTROL (INPUT DATA) ID L pulse from the computer No. 0 software and the No. 1 CONTROL H level derived from the 1 state output side of flip-flop 22. The output of DG 1 is a LOW signal routed to the interface line carrying CONTROL DATA L to the computer No. 1 interface. The CONTROL DATA interface line is bidirectional, so that the signal output of DG 1 goes to the No. 1 interface as well as being applied to inverting amplifier 28 in the No. 0 interface. The HIGH output of amplifier 28 goes to the D (Data) terminal of flip-flop 22, it being understood, as hereinbefore mentioned, that signals must be simultaneously applied to both the C and D terminals to switch flip-flop 22.

Turning now to FIG. 3, the control logic of computer No. 1 which is very similar to that of No. 0 (FIG. 1), will not be described in full, except to remark that the input signals are different, as indicated in FIG. 3. That is, instead of INIT L, the input of NG 1' is No. 1 OK L and this is NANDed with No. 0 OK L via inverting amplifier 29' to give a LOW signal input to the direct clear terminal of flip-flop 22'. Also, NG 4' NANDs a No. 0 CONTROL CLK L with a No. 1 CONTROL CLK L derived from NG 5', whose inputs are No. 1 DATO H and No. 1 CONTROL H, thereby giving a HIGH signal input to the C (CLOCK) terminal of flip-flop 22'. At the same time, No. 1 CONTROL CLK L is routed, via DG 2', to the No. 0 interface and computer No. 0.

The direct set input to flip-flop 22' is derived as a LOW signal from amplifier 30' and NG 2', which latter NANDs the INIT L signal from computer No. 1 with the NG 3' LOW output responsive to the inputs No. 1 OK H and No. 0 OK L.

The Data terminal input for flip-flop 22' is derived from the same type of circuitry, DG 1', and inverting amplifier 28' as in FIG. 1, except that CONTROL DATA L is formed by NANDing No. 1 CONTROL ID L and No. 0 CONTROL H, which latter is supplied from the 0 side of flip-flop 22', or, alternatively, it is derived from the No. 0 interface.

Referring now to FIGS. 2 and 4, each of the computers No. 0 and No. 1 is provided with identical logic circuitry, consisting of INTR (INTERRUPT) flip-flops 37 (and 37'), NAND gates NG 6 and 7 (and NG 6' and 7'), driver gates DG 3 (and DG 3'), pulse generators 24–26 (and 24'–26') and inverting amplifiers 41 (and 41').

The purpose of the INTERRUPT logic circuits is to indicate the occurrence of an interrupt condition, i.e., the fact that either computer has signaled that it is out of action by the transmission of a characteristic DOWN PULSE, or that either of the CONTROL flip-flops 22 and 22' has changed state. Also, the satisfactory operating condition of the other computer of the pair is verified. The last three conditions are monitored by the respective pulse generators 24–26 for the No. 0 computer (FIG. 2) and 24'–26' for the No. 1 computer (FIG. 4).

Considering FIG. 2 in detail, flip-flop 37 is of conventional design, with direct set and direct clear terminals and C (Clock) and D (Data) terminals, the latter of which is grounded in this circuit. Direct clear is effected by the INIT L signal from computer No. 0, whereas the Clock signal is the LOW output of NG 6, which NANDs the inputs INTR ID L and DATO H, both from computer No. 0.

NAND gate NG 7 has four possible inputs, i.e., No. 1 DOWN PULSE L and a transient pulse derived from any of the three pulse generators 24, 25, or 26 responsive to the respective signals No. 1 CONTROL H, No. 0 CONTROL H (both from CONTROL flip-flop 22 of FIG. 1) and No. 0 OK H (from pulse timer 9, FIG. 1). Whenever any of the signal inputs to the pulse generators change from HIGH to LOW, the associated pulse generators emit a transient LOW pulse which is transmitted via NG 7 (HIGH) to inverting amplifier 41 where it is inverted to LOW, thereby effecting direct set of flip-flop 37 with the output of an INTR H signal.

The INTR H signal is transmitted to the interrupt control logic in No. 0 computer, where it operates conjunctively with the INTR ENB H (INTERRUPT ENABLE) signal from the No. 0 computer's logic of FIG. 5, hereinafter described, to effect the interrupt sequence of No. 0 computer.

It will be noted that the transient LOW pulse of pulse generator 26 (FIG. 2) simultaneously passes to DG 3, the output of which is No. 0 DOWN PULSE L routed to the No. 1 interface.

It will be seen that the several inputs of the No. 1 computer interrupt logic of FIG. 4 are identical in all respects with those of the No. 0 computer interrupt logic of FIG. 2, except that the computer No. 1 INTR ID L is substituted for the corresponding No. 0 computer signal, the No. 0 down pulse is substituted as input to NG 7 and the No. 1 OK H signal is substituted or No. 0 OK H, thereby generating No. 1 DOWN PULSE L via DG 3'.

The INTR H output of flip-flop 37' is transmitted to the interrupt control logic in No. 1 computer, where it operates conjunctively with INTR ENB H (INTERRUPT ENABLE) signal from the No. 1 computer's logic of FIG. 5, hereinafter described, to effect the interrupt sequence of the No. 1 computer.

Referring to FIG. 5, there is shown the identical interrupt enable logic hardware employed for each computer, the circuitry shown in FIG. 5 being specifically that for the No. 0 computer. This circuitry is responsive to computer software exclusively.

The circuitry utilizes a conventional flip-flop 46 having direct set and direct clear terminals and also (CLOCK) C and (DATA) D inputs. A +3 v. voltage source is continuously applied to the direct set, whereas INIT L from the No. 0 computer is connected to the direct clear terminal. The No. 0 computer DATO H is input at C, whereas the No. 0 computer INTR ENB ID L (i.e., INTERRUPT ENABLE INTERNAL DATA LOW) is first amplified in inverting amplifier 47 and thereafter input to D.

The output INTR ENB H (INTERRUPT ENABLE HIGH) signal is utilized simultaneously with the INTERRUPT HIGH signal and is fed into an interrupt control module of the No. 0 computer to generate an interrupt signal within the computer directing it to initiate specific software, which handles interrupts from the No. 0 redundancy interface. It also coincidentally halts any computer No. 0 software task in operation.

As already mentioned, the INTERRUPT ENABLE hardware for the No. 1 computer is identical in all respects to that of the No. 0 computer, except that the inputs INIT L, DATO H and INTR ENB ID L all derive from the No. 1 computer, whereas the output INTR ENB H is utilized simultaneously with the INTERRUPT HIGH signal of the No. 1 computer and is fed into an interrupt control module of the No. 1 computer where it functions in exactly the same manner with respect to the No. 1 computer as hereinbefore described for the No. 0 computer.

The status of INTERRUPT and INTERRUPT ENABLE flip-flops is indicated by the state of bits D01 and D00 in the storage register of FIG. 8 for the specific computers involved.

Referring to FIG. 6, the control bus is a length of seven-conductor 22 gauge flat cable. Each wire in the cable is used to carry the state of the signals as denoted, i.e., CONTROL DATA L, No. 0 CONTROL CLK L, No. 1 CONTROL CLK L, No. 0 OK L, No. 1 OK L, No. 0 DOWN PULSE L and No. 1 DOWN PULSE L. As previously described, there are only two states possible for these lines, either HIGH, i.e., between about 2.4 v. and 4 v., or LOW, between 0.0 v. and 0.8 v. The LOW state is the asserted condition on the bus.

All signals listed in FIG. 6, with the exception of CONTROL DATA L, are uni-directional. Thus, each line (other than CONTROL DATA L) can be driven LOW by one interface, either No. 0 or No. 1, but not by both. This is due to the fact that all lines, except CONTROL DATA L, have only one driver gate, which is in either the No. 0 or No. 1 interface. CONTROL DATA L is bi-directional, and has two driver gates. It can be driven LOW by either the No. 0 or No. 1 interfaces.

The driver gates are open collector NPN transistor devices which function like switches. If the base is HIGH, then the transistor switch is closed and continuity exists between the collector (i.e., the cable terminator side) and ground. During this time the collector voltage is approximately 0.7 v. If the base potential is LOW, then the switch is open and voltage at the collector terminal is undefined. To eliminate this, each line is provided with a multiplicity of diodes, typically four in number, housed within the cable terminator and connected in series to ground. Vcc is a common source of collector bias voltage, typically +5.0 v. Accordingly, if the transistor switch is open, current flows from Vcc through a collector biasing resistor and thence through the string of diodes, maintaining the collector voltage at approximately 3.0 volts. When the transistor base voltage is HIGH, the transistor switch closes and shunts the diode string, dropping the collector voltage to 0.7 v.

Each wire at both ends of the control bus is provided with a terminator circuit as described, thereby keeping the line HIGH even when one of the interfaces is powered down. Each end of the line is connected to the collector side within the terminator.

FIG. 7 depicts, in block diagram format, the individual circuit components (for the No. 0 computer) for the apparatus according to this invention described in detail. The No. 1 computer requires essentially duplicate apparatus, except that the No. 1 OK and No. 0 OK inputs to the I/O cable are transposed in relative position and the timer output vertical connection then runs to the No. 1 OK line.

The abbreviation BR7 denotes "highest priority bus request No. 7" for the INTERRUPT action. Also, CSR SEL (CONTROL STATUS REGISTER SELECT) indicates the computer designation of address.

FIG. 9 is a layout of standard Digital Equipment Corporation logic modules used in the circuitry of this invention. Thus, FIG. 9 is the actual interface as regards a PDP 11/45 computer.

In elaboration of the vertical printed legendry of FIG. 9, Top Section A, the "Bus Receivers" module relates to small amplifiers amplifying signals from the unibus, these also providing isolation between the unibus and the interfaces of this invention. The "Blank Modules," Bottom Section B, consist of three specific types: (1) capacitor cards for the timers, (2) relay cards for alarm actuation (advising the human operator of switchover of control) and (3) cable to alarm.

The prefix "WDT" in modules M302, M050 and all three W998 is an abbreviation for "Watch Dog Timer," a term customarily used in the art for hardware such as timers 9 and 9'.

The NAND gate modules are reversed to two-input gates, whereas "POWER NAND gates" refers to four-input gates.

The PDP 11/45 machine language computer program is as follows:

| | | |
|---|---|---|
| 1 | 000000 | R0=%0 |
| 2 | 000001 | R1=%1 |
| 3 | 000002 | R2=%2 |
| 4 | 000003 | R3=%3 |
| 5 | 000004 | R4=%4 |

-continued

| | | | | | |
|---|---|---|---|---|---|
| 6 | 000005 R5=%5 | | | | |
| 7 | 000006 R6=%6 | | | | |
| 8 | | | | | ; SET UP INTERRUPT VECTORS |
| 9 000000 | 012737<br>000074'<br>000100 | MOV | # CLKINT, at # 100 | | ; CLOCK INTERRUPT VECTOR |
| 10 00006 | 005037<br>000102 | CLR | at No. 102 | | |
| 11 00012 | 012737<br>000104'<br>000400 | MOV | # REDINT, at # 400 | | ; REDUNDANCY INTERRUPT VECTOR |
| 12 00020 | 012737<br>000340<br>000402 | MOV | # 340, at # 402 | | |
| 13 00026 | 012701<br>177570 | MOV | # 177570,R1 | | ; R1=SWITCH REGISTER ADDRESS |
| 14 00032 | 012702<br>177546 | MOV | # 177546,R2 | | ; R2=60 HZ. CLOCK ADDRESS |
| 15 00036 | 012703<br>164060 | MOV | # 164060,R3 | | ; R3=REDUNDANCY REGISTER ADDRESS |
| 16 00042 | 012706 START:<br>000500 | MOV | # 500,R6 | | ; SET UP STACK LIMIT |
| 17 00046 | 012712<br>000100 | MOV | # 100,(R2) | | ; ENABLE CLOCK INTERRUPT |
| 18 00052 | 111100 LOOP1: | MOVB | (R1),R0 | | ; SET UP TIMER COUNTER FROM SWITCHES |
| 19 00054 | 005737<br>164062 | TST | at # 164062 | | ; PULSE REDUNDANCY TIMER |
| 20 00060 | 011113 LOOP2: | MOV | (R1),(R3) | | ; MODIFY REDUNDANCY REGISTER FROM |
| 21 | | | | | ; SWITCH REGISTER |
| 22 00062 | 011311 | MOV | (R3),(R1) | | ; DISPLAY THE REDUNDANCY REGISTER |
| 23 | | | | | ; IN SWITCH REGISTER LAMPS |
| 24 00064 | 020067<br>000030 | CMP | R0,TLIMIT | | ; COUNTER < OR = TO TLIMIT |
| 25 00070 | 003770 | BLE | LOOP1 | | ; YES - GO TO LOOP1 |
| 26 00072 | 000772 | BR | LOOP2 | | ; NO - GO TO LOOP2 |
| 27 00074 | 042712 CLKINT:<br>000200 | BIC | # 200,(R2) | | ; CLEAR CLOCK INTERRUPT |
| 28 00100 | 005300 | DEC | R0 | | ; DECREMENT TIMER COUNTER |
| 29 00102 | 000002 | RTI | | | |
| 30 00104 | 011311 REDINT: | MOV | (R3),(R1) | | ; DISPLAY THE REDUNDANCY REGISTER IN |
| 31 | | | | | ; IN SWITCH REGISTER LAMPS |
| 32 00106 | 000000 | HALT | | | |
| 33 00110 | 005037<br>177776 | CLR | at # 177776 | | ; CLEAR PROCESSOR STATUS WORD |
| 34 00114 | 000167<br>177722 | JMP | START | | |
| 35 00120 | 000010 TLIMIT: | .WORD | 10 | | |
| 36 | 000001' | .END | | | |

FIGS. 10, 11A and 11B are the flow charts corresponding to the computer program, with specific program cards cross-referenced.

What is claimed is:

1. A redundancy interface maintaining liaison between two parallel-connected computers, a first of which is nominated for on-line process control whereas a second is in standby until called upon to take over control from said first if, for any reason, said first computer is disabled or arbitrarily taken out of service, comprising, in combination, a first sub-circuit associated with said first computer and a second sub-circuit associated with said second computer, said sub-circuits each comprising
   a. timer means monitoring the operation of its associated computer and verifying acceptable computer operability by output of an electrical timer signal,
   b. computer status designating means,
   c. switching means responsive to computer software actuating said computer status designating means,
   d. fault designating means cleared by computer software,
   e. fault detecting means responsive to said electrical timer signals individually or to said computer status designating means, actuating said fault designating means,
   f. interrupt means halting the task currently in execution by the associated computer responsive to said fault designating means,
   g. communication means maintaining electrical circuit connection between said sub-circuits, and
   h. display means indicating operation of the timer means of both said computers and the states of said computer status designating means, said fault designating means, and said interrupt means.

2. Apparatus according to claim 1 wherein said computer status designating means is a control flip-flop and said switching means is the control logic therefor.

3. Apparatus according to claim 1 wherein said fault designating means is an interrupt flip-flop and said fault detecting means is the interrupt logic therefor.

4. Apparatus according to claim 1 wherein said interrupt means constitutes a flip-flop and interrupt enable logic therefor.

5. Apparatus according to claim 1 wherein said communication means is an input-output cable provided with a cable terminator.

6. Apparatus according to claim 1 wherein said display means is a redundancy storage type register.

* * * * *

UNITED STATES PATENT OFFICE
CERTIFICATE OF CORRECTION

PATENT NO. : 3,991,407
DATED : November 9, 1976
INVENTOR(S) : Lloyd E. Jordan, Jr. and Doane W. Lee It is certified that error appears in the above–identified patent and that said Letters Patent are hereby corrected as shown below:

Col. 3, line 10 (approx.) - "bit" should read --This bit--.

Signed and Sealed this

First Day of March 1977

[SEAL]

Attest:

RUTH C. MASON
Attesting Officer

C. MARSHALL DANN
Commissioner of Patents and Trademarks